United States Patent [19]
Kiefer

[11] 4,360,334
[45] Nov. 23, 1982

[54] THERMOFORMING MACHINE

[75] Inventor: Günther Kiefer, Schwaigern, Fed. Rep. of Germany

[73] Assignee: Adolf Illig GmbH & Co., Heilbronn, Fed. Rep. of Germany

[21] Appl. No.: 196,107

[22] Filed: Sep. 29, 1980

[30] Foreign Application Priority Data

Oct. 2, 1979 [DE] Fed. Rep. of Germany ....... 7927975

[51] Int. Cl.³ .............................................. B29C 17/04
[52] U.S. Cl. ................................. 425/387.1; 425/398; 425/402
[58] Field of Search ............. 425/423, 360, 361, 387.1

[56] References Cited

U.S. PATENT DOCUMENTS

| | | | |
|---|---|---|---|
| 2,282,423 | 5/1942 | Kopitke | 425/387.1 X |
| 2,745,135 | 5/1956 | Gora | 264/37 X |
| 3,574,894 | 4/1971 | Aoki | 425/589 X |
| 3,679,803 | 7/1972 | Palencher | 425/423 X |
| 3,788,032 | 1/1974 | Heffernan et al. | 425/398 X |
| 4,043,729 | 8/1977 | Paracchi | 425/398 X |
| 4,158,539 | 6/1979 | Arends et al. | 425/589 X |
| 4,265,852 | 5/1981 | Sauer | 425/387.1 X |

FOREIGN PATENT DOCUMENTS

| | | |
|---|---|---|
| 1951913 | 4/1971 | Fed. Rep. of Germany . |
| 1779752 | 2/1972 | Fed. Rep. of Germany . |
| 2727820 | 1/1979 | Fed. Rep. of Germany . |
| 1305246 | 8/1962 | France .............................. 425/361 |

*Primary Examiner*—Philip E. Anderson
*Attorney, Agent, or Firm*—Spencer & Kaye

[57] ABSTRACT

A thermoforming machine having a plurality of stations arranged in a circle, i.e., a charging station for insertion of a plate or sheet of thermoplastic material, a heating station, a forming station and a discharging station for the finished part (which discharging station may be the same as the charging station) and a like plurality of clamping frames for the thermoplastic material which frames can be pivoted from station to station, and with the forming station being provided with a height adjustable mold table for accommodating a deep drawing mold and a height adjustable blow box. To raise and lower the mold table, a pair of hydraulic cylinders are symetrically arranged on the respective sides of the mold table with the cylinders being essentially vertical in the interior of the blow box. Each of the cylinders and its associated piston rod is connected between a stationary support plate for the mold table and the mold table.

8 Claims, 5 Drawing Figures

THERMOFORMING MACHINE

BACKGROUND OF THE INVENTION

The present invention relates to a thermoforming machine having a plurality of stations, i.e., a charging and a discharging station, a heating station and a forming station, arranged in a circle and a like plurality of clamping frames for thermoplastic material, which frames can be pivoted from station to station. More particularly, the present invention relates to such a thermoforming machine wherein the forming station is provided with a height adjustable mold table to accommodate a deep drawing mold, and a likewise height adjustable blow box which serves to produce an area enclosed on all sides and disposed underneath a plate of thermoplastic material clamped in the forming station so that the known process steps of preliminary blowing or preliminary suction become possible.

In such forming stations, the lifting movement of the mold table is known to be produced by means of pneumatic or hydraulic cylinders. If these cylinders are disposed below the mold table, this requires the installation of pits in the fabricating halls which is expensive and not always feasible. Alternatively the support or foundation structures for the forming station would have to be given the shape of podiums which makes operation more difficult.

Various solutions for this problem are known. For example, it has already been proposed to mount the cylinders of forming machines for plate material on a fixed clamping frame and to pull up the mold table. In this case, the cylinders are disposed either to the side (German Utility Model Patent No. 6,605,530), at the four corners (German Offenlegungsschrift (laid open) application) No. 1,779,752) or in the rear (German Utility Model Patent No. 7,501,702). All of these solutions fail, however, in machines of the type initially described above which require rotary clamping frames whose rotary movement would be prevented by the cylinders in each of the above-mentioned cases. In a drive for the mold table as proposed in German Offenlegungsschrift No. 1,951,913, the size of the lift depends on the length of the table which usually is incompatable because of the size relationships involved.

With a chain drive for the mold table as proposed in German Offenlegungsschrift No. 2,727,820, problems exist regarding fastening of the chains if a height adjustable blow box is to be installed. A likewise known scissors hoist for the mold table does not have a uniform sequence of movements or a constant lifting force over the entire stroke, and additionally is expensive.

SUMMARY OF THE INVENTION

It is the object of the present invention to design the drive or lifting mechanism for the mold table of the forming station in such a way that the clamping arms or frames can pivot unimpededly. Moreover, the drive should produce a constant lifting force over the entire lifting stroke, have a uniform sequence of movements and the length of the lifting stroke should not depend on the size of table. Finally, it should be possible to install a height adjustable blow box in the forming station.

The above object is achieved according to the invention in that the lifting or height adjusting mechanism for the mold table comprises a pair of essentially vertical hydraulic cylinders which are arranged symetrically adjacent the respective sides of the mold table, which extend into the interior of the blow box and which are operatively connected between a stationary support plate for the mold table and the mold table.

According to one embodiment of the invention the cylinders are oriented so that their respective piston rods extend upward and their lower ends are fastened to the stationary support table. The end of each piston rod is connected to the upper end of a coaxially oriented tube which extends into the blow box via an opening in the blow box cover (which opening guides the tube for axial movement) and which has its lower end fastened to the mold table.

According to another embodiment of the invention the cylinders are oriented so that their respective piston rods extend downward and are connected to the stationary support plate for the mold table, and so that their lower ends are connected to the mold table. The upper end of each cylinder extends through a respective opening in the cover of the blow box and is guided therein for axial movement.

DETAILED DESCRIPTION OF THE PREFERRED EMBODIMENTS

Figure 1:
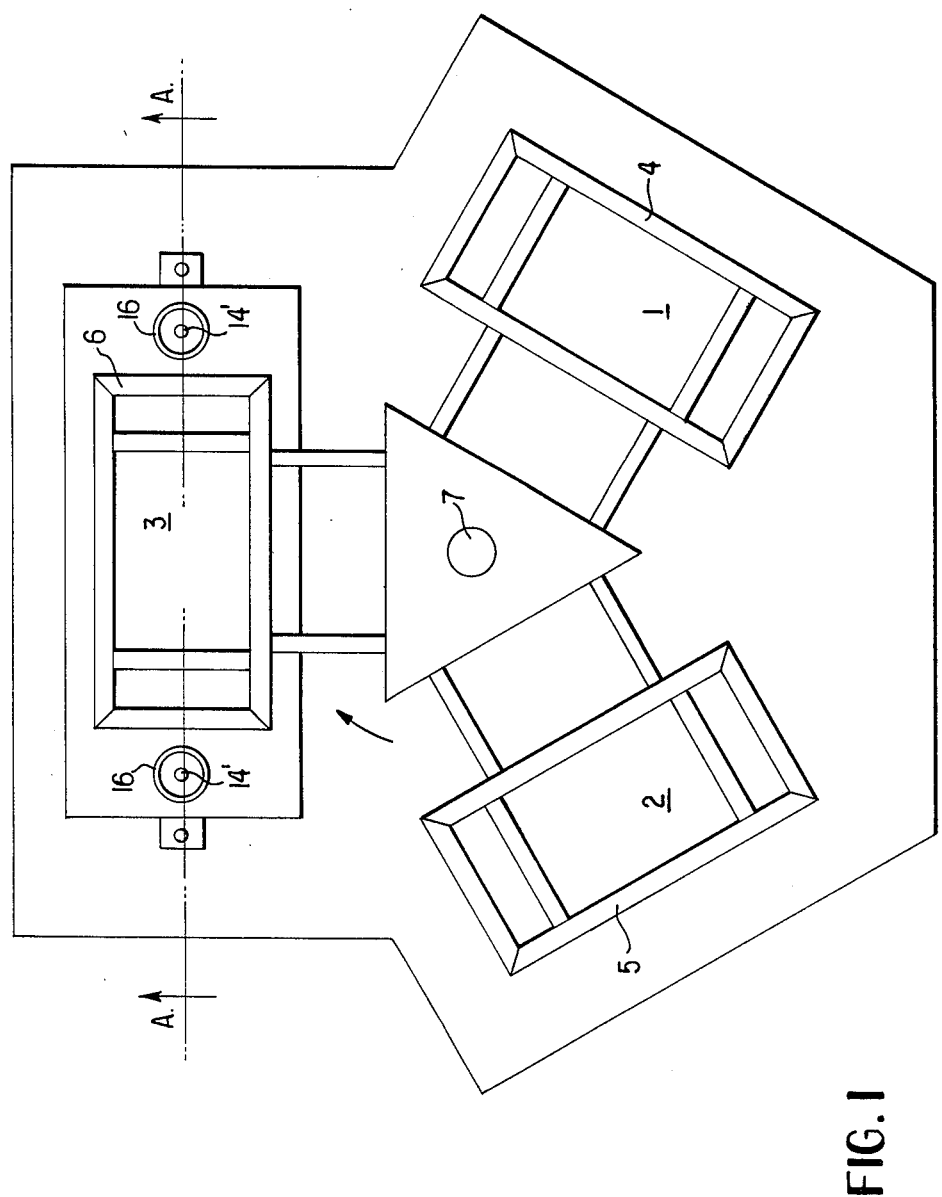
FIG. 1 is a schematic top view of a thermoforming machine of the type to which the present invention relates

As shown in FIG. 1, the thermoforming machine comprises a plurality of work stations, i.e., a charging and discharging station 1, a heating station 2 and a forming station 3, arranged in a circle. The thermoforming machine is additionally provided with a plurality of clamping frames 4-6 corresponding in number to the number of stations, i.e., three. The clamping frames 4-6 are mounted so that they are pivotable about a center of rotation 7 and can be moved successively to each of the stations 1-3. Each of the clamping frames accommodates a sheet or plate 8 of thermoplastic material (see FIG. 2a).

Figure 2B:
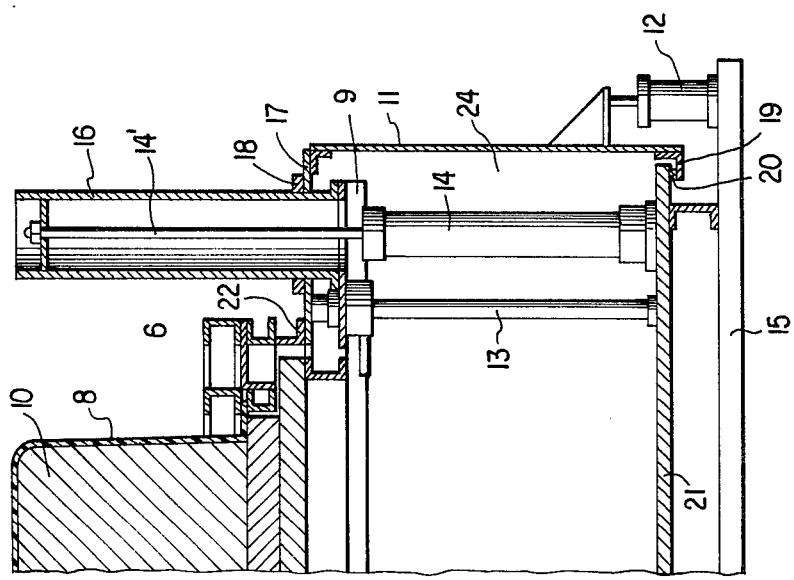
FIGS. 2a and 2b are cross-sectional views along the line A-A of FIG. 1 of the forming station according to one embodiment of the invention with the mold table and blow box being shown in the lowered position in FIG. 2a and in the raised position in FIG. 2b.
Figure 2A:
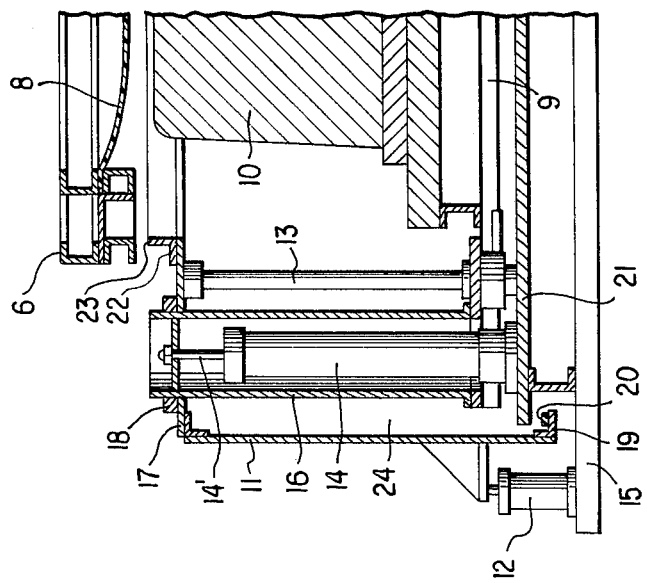

As shown in FIGS. 2a and 2b, the forming station 3 includes a height adjustable mold table 9 to accommodate a deep drawing mold 10, a likewise height adjustable blow box 11 mounted on lifting cylinders 12 for same, and a known height equalizer 13 for the mold table 9.

The principle of a height equalizer installed into the forming station of a thermoforming machine is, e.g. know from the German Offenlegungsschrift 1 951 913. There the drive cylinder is assembled in a horizontal position under the forming table.

According to the invention, a pair of vertically oriented hydraulic lifting cylinders 14 are symmetrically arranged on either side of the mold table 9 so as to perform the lifting movement for same. Each of these lifting cylinders 14 has its lower end supported, and connected to, the support frame 15 for the thermoforming machine. In the embodiment specifically illustrated in FIG. 2a and FIG. 2b, the lower end of each cylinder 14 is actually supported by and connected to a stationary support plate 21 which in turn is supported on and fastened to the frame 15. The piston rod 14' of each cylinder 14 is, in turn, fastened to the upper end of a pipe or tube 16 which is oriented coaxially with the cylinder 14. The pipe 16 protrudes downwardly through an opening in the cover 17 of the blow box 11, which opening guides the pipe 16 during axial movement of same, and the lower end of the pipe 16 is connected with the mold table 9, for example, by welding. A suitable seal 18 is provided at the opening through the cover 17. The lower end of the peripheral wall of the blow box 11 is provided with a circumferential inwardly directed flange 19 on which is mounted on a seal 20 which can be pressed against the lower surface of the stationary plate 21 when the blow box 11 is raised. The inner periphery of the cover 17 of the blow box 11 is likewise provided with a flange 22 which supports a seal 23 which comes into operation when the blow box 11 is raised.

In operation, if the clamping frame 6 has pivoted a heated plate 8 of thermoplastic material into the forming station 3, the blow box 11 is raised by means of the cylinders 12. The raising of the blow box 11, as shown in FIG. 2b, causes it to be sealed at the bottom by the seal 20 bearing against the lower surface of the plate 21 and at the top by the seal 23 bearing against the lower surface of the clamping frame 6. Thus, together with the clamped-in plate 8, a closed area 24 is formed around the mold 10. Preliminary blowing or preliminary suction against the plate 8 is then possible.

Thereafter the cylinders 14 are charged with pressure and the mold table 9 is raised. During the raising of the mold table 9, the pipes 16 move upwardly out of the blow box 11 to the final position shown in FIG. 3b. The fact that in this position the pipes 16 would impede rotation or pivoting of the clamping frames 4-6 is of no consequence, however, since they must be lowered to their original position, in any case, in order to withdraw the mold 10 from the clamping frame before further rotation of same to the next station can take place. The forming of the plate 8 is effected in a known manner by means of a vacuum.

Figure 3B:
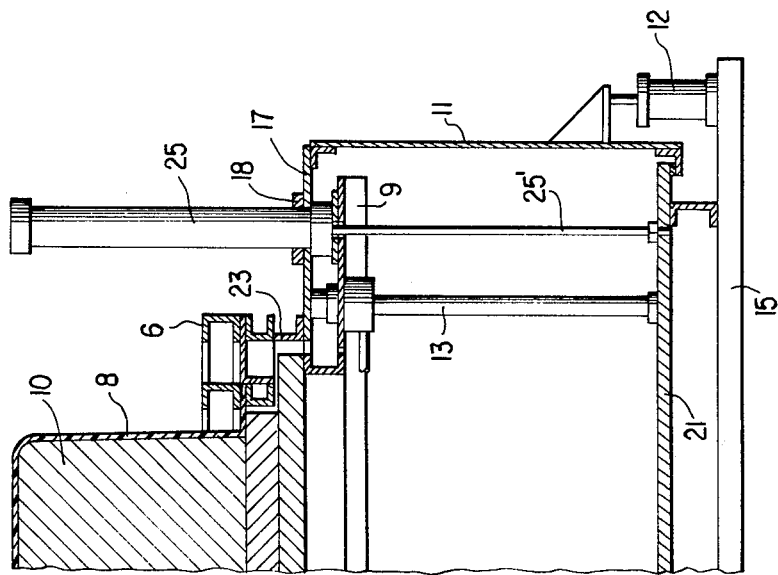
FIGS. 3a and 3b are cross-sectional views analogous to FIGS. 2a and 2b showing the arrangement of the lifting cylinders for the mold table according to another embodiment of the invention.
Figure 3A:
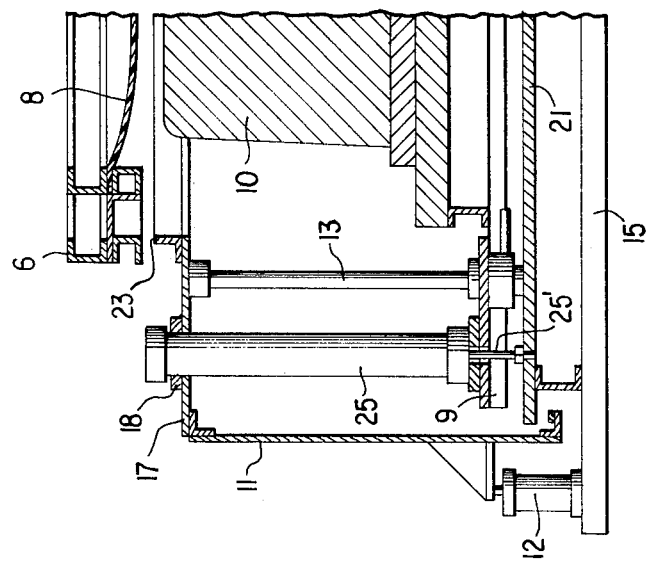

As an alternative to the arrangement shown in FIGS. 2a and 2b, the cylinders for the lifting movement of the mold table 9 may also be arranged as shown in FIGS. 3a and 3b wherein the same parts are designated by the same reference numerals. In this case, each cylinder 25 is installed with its piston rod 25' facing downward and fastened in the plate 21. The lower end surface of each cylinder 25 is fastened, for example, screwed to the mold table 9, and the upper end of each cylinder 25 protrudes through respective openings in the cover 17 which openings guides the cylinder 25 during their axial travel from the lowered position of FIG. 3a to the raised position of FIG. 3b. The process sequence is analogous to that of FIGS. 2a and 2b.

The present invention is of course not limited to thermoforming machines having three stations. Analogously it also covers two and four station machines as they are generally known.

It is to be understood that the above description of the present invention is susceptible to various modifications, changes and adaptations, and the same are intended to be comprehended within the meaning and range of equivalents of the appended claims.

What is claimed is:

1. In a thermoforming machine having a plurality of work stations, including at least a charging station for the insertion of a plate of thermoplastic material, a heating station for heating the plate, and a forming station for forming the plate into a desired article, with said stations being arranged in a circle, a like plurality of clamping frames for holding respective plates of thermoplastic material, means for mounting said clamping frames so that they can be pivoted successively from station to station, and wherein said forming station is provided with a height adjustable mold table accommodating a deep drawing mold, and a height adjustable blow box; the improvement comprising means for adjusting the height of said mold table including a pair of hydraulic cylinders arranged symetrically adjacent respective sides of said mold table, with said cylinders being essentially vertical and extending into the interior of said blow box and with each said cylinder and its associated piston rod being connected between a stationary support plate for said mold table and said mold table.

2. A thermoforming machine as defined in claim 1 wherein said cylinders are mounted in said forming station with their respective piston rods extending upward and with the cylinders being connected to said support plate; and wherein each said piston rod is connected with the upper end of a respective coaxially mounted pipe which extends through and is guided by a respective opening in the cover of said blow box and which has its lower end fastened to said mold table.

3. A thermoforming machine as defined in claim 1 wherein: said cylinders are mounted in said forming station with their respective piston rods extending downwardly and being connected with said stationary support plate; the lower end surface of each of said cylinders is connected with said mold table; and each of said cylinders extends upwardly through a respective opening in the cover of said blow box and is guided in said opening during upward movement of same.

4. A thermoforming machine as defined in claim 2 or 3 wherein seals are provided around said openings in said cover of said blow box.

5. Thermoforming machine as defined in claim 1, 2 or 3 wherein said forming station further includes a height equalizer for said mold table.

6. A thermoforming machine as defined in claim 1, 2 or 3 wherein said cylinders and their associated said piston rods are disposed substantially entirely within said blow box when said piston rods are in a retracted position.

7. A thermoforming machine as defined in claim 6 wherein: said clamping frames are disposed in a plane which is vertically displaced from said mold table and said blow box during pivoting of said clamping frames; said mold table and said blow box are adjustable in height toward and away from said plane; and said cylinders and associated said piston rods are disposed between said plane and the surface of said mold table which faces said plane when said piston rods are in a retracted position.

8. A thermoforming machine as defined in claim 7 wherein said plane is above said blow box and said mold table.

* * * * *